Jan. 18, 1966    R. C. MAUER    3,230,392
SINGLE PULSE GENERATOR FOR ALTERNATING SIGNAL SOURCE
Filed April 9, 1963    3 Sheets-Sheet 2

INVENTOR.
ROBERT C. MAUER
BY
George C. Sullivan
Agent

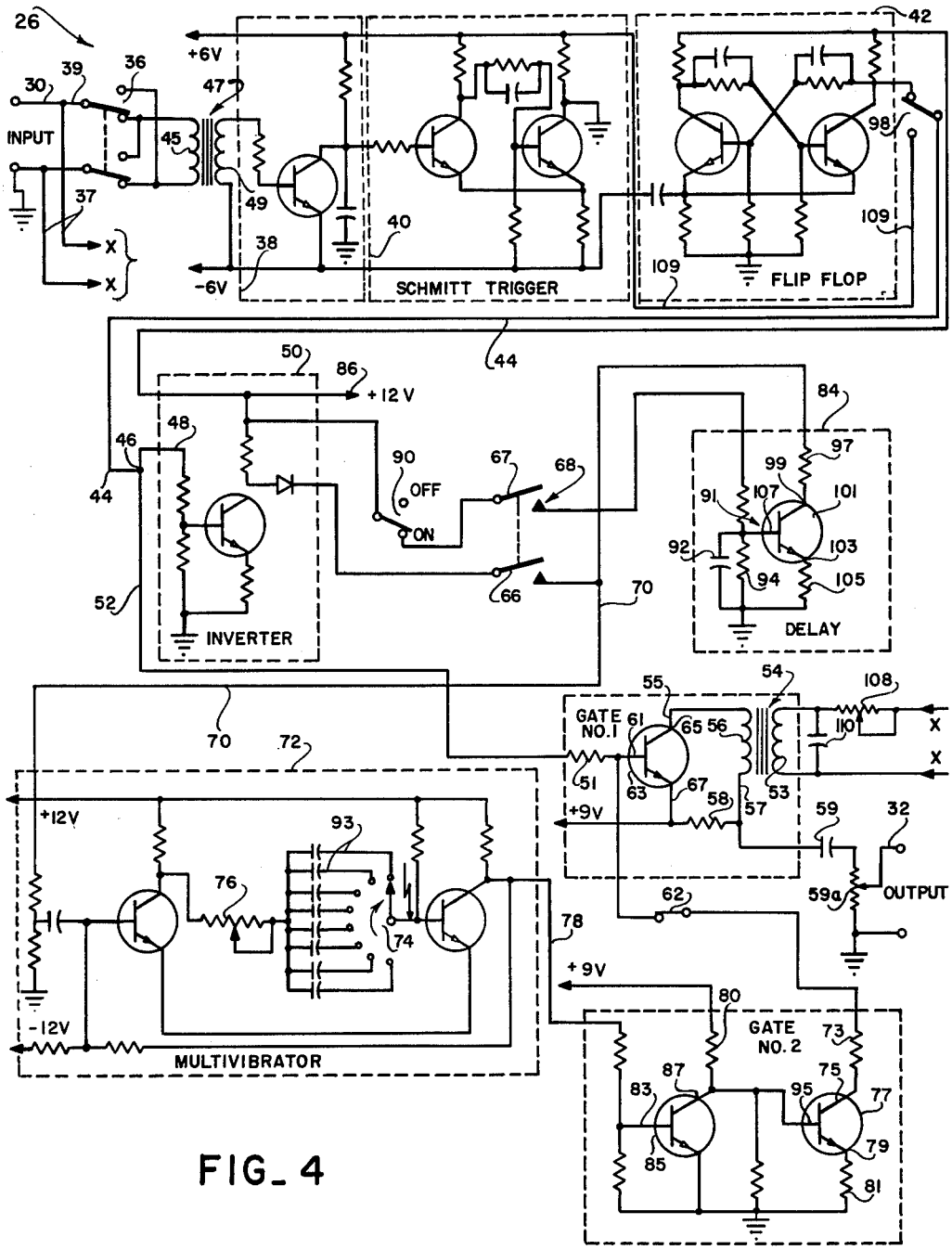
FIG_4

United States Patent Office 3,230,392
Patented Jan. 18, 1966

3,230,392
SINGLE PULSE GENERATOR FOR ALTERNATING
SIGNAL SOURCE
Robert C. Mauer, Sunland, Calif., assignor to Lockheed
Aircraft Corporation, Los Angeles, Calif.
Filed Apr. 9, 1963, Ser. No. 271,624
4 Claims. (Cl. 307—88.5)

This device relates generally to a signal generator and more particularly to an electronic circuit for producing a single full or half wave voltage pulse on a train of spaced single full or half wave voltage pulses.

The increasing importance of quality control in modern technology has led to an interest in more exact techniques for environmental testing of components. Certain of such techniques involve the use of vibration of shock tables. These tables are really electromagnets, so driven by a suitable signal generator that the table is forced to vibrate at any desired intensity and frequency. The table or component supporting surface is usually secured to the armature of the electromagnet such that a pulsating voltage from the signal generator, when applied to the coil of the electromagnet, causes the supporting surface to vibrate in a manner well known in the art. Other environmental techniques involve dropping the component on a surface from a predetermined height in order to determine its impact strength. However, such techniques are not particularly accurate due to the difficulty in controlling the duration of the impact period.

The development of adequate testing techniques achieves added importance since many of the design specifications for components used in sophisticated technologies are defined in terms of environmental testing capacity, one of the environmental factors to be tested being the ability of a component to withstand a single voltage pulse having a precisely determined duration and intensity.

Since vibration tables and conventional signal generators are already available, it would be economically desirable to modify existing equipment so that a single pulse or a train of spaced individual full of half wave pulses can be applied to the vibration or shock table to thereby apply a shock wave of precisely determined duration and intensity to the component under test.

Therefore, an important object of this invention is to provide a circuit which can supply single full or half wave voltage pulses.

Another object is to provide a circuit capable of supplying a train of spaced single full or half wave voltage pulses.

Yet another object is to provide a gating circuit operable on any one or a plurality of signal shapes and capable of passing only a predetermined portion of the output of a signal generator with a high degree of control and repeatability.

Still another object is to provide an environmental testing unit capable of supplying to a test component voltage pulses having precisely determined duration and intensity.

These and other objects of invention will become more apparent when read in the light of the accompanying drawings and specification wherein:

FIGURE 4 is a circuit diagram of the single pulse generator.

Figure 1:
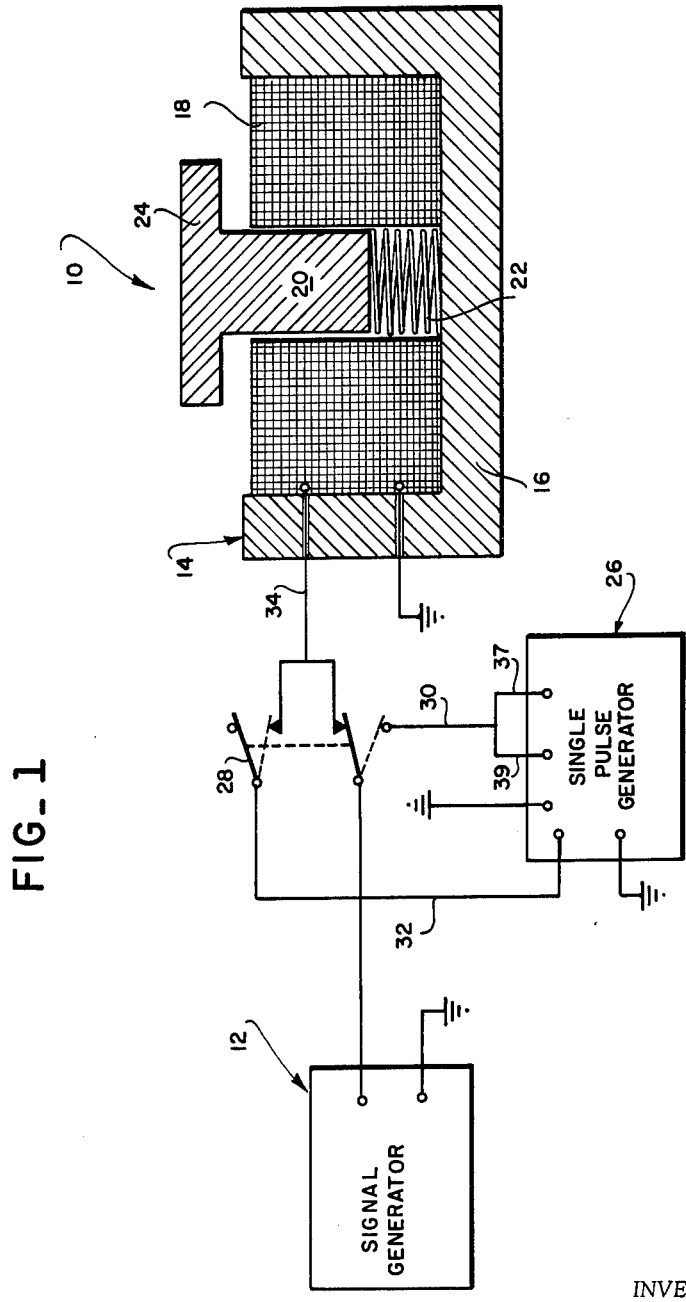
FIGURE 1 is a schematic view of a vibration table in combination with a conventional signal generator and the single pulse generating circuit.
Figure 3:
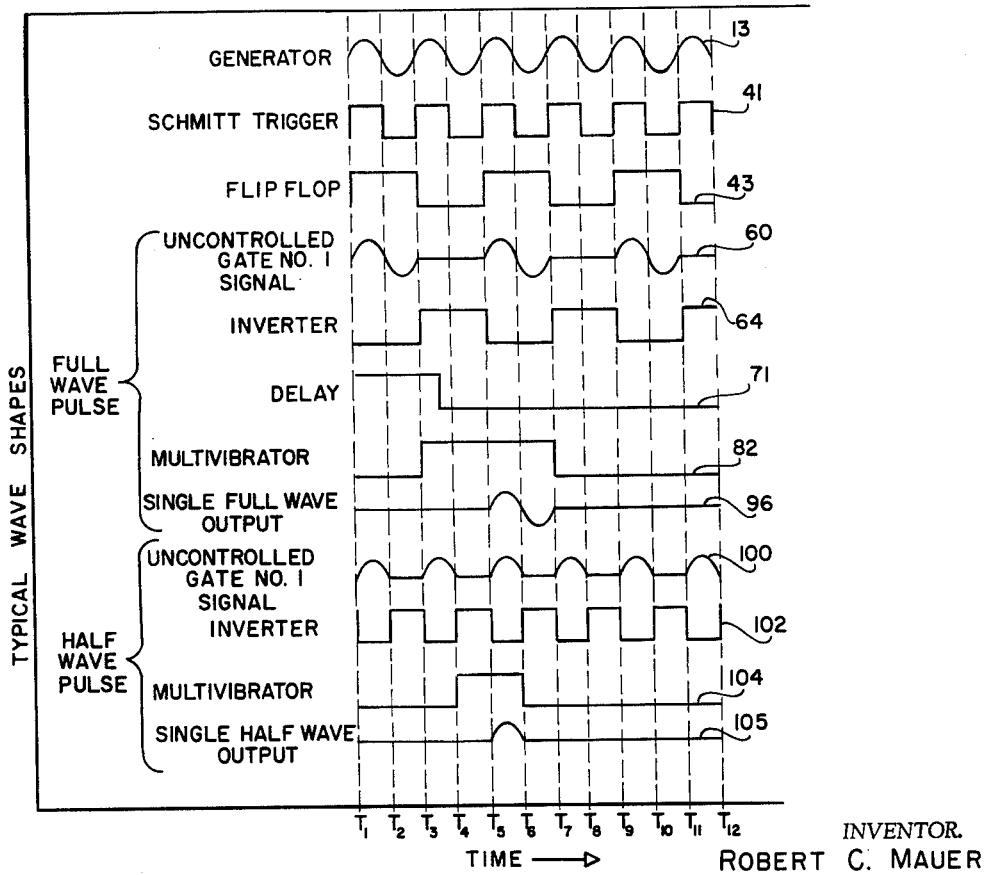
FIGURE 3 is a diagram showing the various wave shapes developed by different components of the single pulse generator and the signal generator.

Referring now to FIGURE 1 of the drawings an environmental test device, indicated generally by the reference numeral 10, comprises a conventional signal generator 12, a conventional vibration or shock table 14, and a single pulse generator 26. The signal generator is capable of delivering a continuous pulsating voltage over a wide frequency band and at varying intensities. In FIGURE 3, the signal generator 12 is shown as delivering a sinusoidal voltage. Nevertheless, it will be understood that the principles of this invention can be applied to signal generators supplying any kind of pulsating signal voltage, for example, a sine, square, or saw-tooth signal, or any combination thereof.

The vibration table shown in FIGURE 1 comprises a support 16 with an electromagnetic coil 18 mounted therein. An armature 20 may be resiliently mounted in the core of the coil by means of a resilient member such as coil spring 22. A supporting surface 24 is rigidly secured to the armature 20 and serves as the table to support the item to be tested. In such arrangement, a pulsating voltage applied to the coil 18 from the signal generator 12 causes the armature 20 and supporting surface 24 to vibrate in a manner determined by the frequency, intensity and wave form of the voltage output from the signal generator 12.

Single pulse generator 26 is adapted to be connected to the shock table through a double arm switch 28. When the double arm switch is in the solid line position shown in FIGURE 1, the signal generator 12 is connected directly to the vibration table. When the double arm switch is moved to the dotted line position, the output of the signal generator is connected to the input 30 of the single pulse generator 26.

The output lead 32 of the single pulse generator is fed into the shock table 14 or to any other similarly connected equipment through lead 34. In this way, as will become more apparent below, the shock table 14 can deliver continuous pulses or impacts to the component being tested. Alternatively, by moving the switch 28 to the dotted line position, the shock table 14 can deliver a single pulse or impact of any desired wave shape, duration, and intensity to the component under test.

Figure 2:
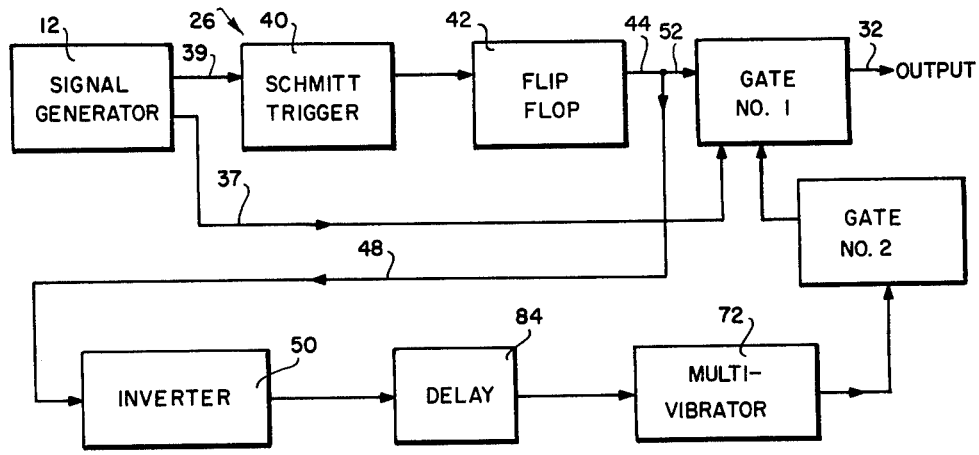
FIGURE 2 is a block diagram showing the single pulse generator connected to the signal generator.

The components of the single pulse generator 26 are shown diagrammatically in FIGURE 2 and more specifically in the circuit diagram in FIGURE 4.

The sinusoidal voltage output 13 of the signal generator 12 is fed into input 30 of the single pulse generator 26 through paths 37 and 39 (see FIGURES 1 and 2). In path 39, the signal voltage from generator 12 passes through a reversing switch 36 to the primary coil 45 of isolating transformer 47. The secondary 49 of transformer 47 feeds into a conventional transistorized amplifier 38. Amplifier 38 regulates the input voltage signal and supplies it to the input of a conventional Schmitt Trigger 40 in accordance with the design requirements of the Schmitt Trigger.

The Schmitt Trigger 40 operates as a square wave generator to provide a square wave output signal voltage 41 (FIGURE 3) in a manner well known in the art. This signal is at the same repetition rate and is in phase with the sinusoidal output 13 from the signal generator 12. The output signal from the Schmitt Trigger 40 is connected to the input of a conventional flip-flop circuit 42 which is designed to provide a square wave output signal 43. In the particular embodiment shown, the output signal is one-half the repetition rate of the signal from the Schmitt Trigger.

The square wave signal output 43 (FIGURE 3) from the flip-flop 42 is directed through lead 44 to branch connection 46. One branch 48 leads into an inverter 50 for reasons to be described below, and the other branch 52 leads to the input of gate No. 1. The signal output 43 enters gate No. 1 through biasing resistor 51 which is connected to the base 61 of the transistor 63. The transistor 63 is biased such that a positive pulse from flip-flop 42 impressed on base 61 causes transistor 63 to become conductive.

The alternating voltage signal 13 from the signal generator 12 is fed directly into gate No. 1 through path 37 comprising leads x—x. This signal passes through a phase shifting network, to be described below, to the primary coil 53 of isolating transformer 54. One of the leads 55 of the secondary coil 56 of transformer 54 is connected directly to the collector 65 of transistor 63 and the other lead 57 is connected to the emitter 67 of transistor 63 through voltage dropping resistor 58. In addition, lead 57 is connected to output terminal 32 through a filter capacitor 59 and a variable resistor 59a.

The transistor 63 and the resistor 58 are in series with one another and in parallel with the secondary coil 56 of the transformer 54. With this arrangement transistor 63, if it becomes conductive due to a positive pulse from the flip-flop 42 being impressed on base 61, sees a sharp drop in impedance so that the greater portion of the voltage on secondary coil 56 will appear across resistor 58. Consequently, this voltage will also appear on output terminal 32.

However, when a negative pulse from the flip-flop 42 reaches the base 61 of transistor 63, the transistor becomes non-conductive and its impedance becomes much greater than the magnitude of resistor 58. Consequently, the greater portion of the voltage on the secondary coil 56 appears across transistor 63 and substantially no voltage will appear across resistor 58.

To this point, output signal 43 from the flip-flop 42 has a period double that of the signal output 43 from the signal generator 12. When the signal 43 is positive, the transistor 63 will be conductive for a time sufficient to permit a full sinusoidal wave from the signal generator 12 or from the coil 56 to pass through gate No. 1 to the output lead 32. However, during the next complete sinusoidal wave, the flip-flop will be negative. Consequently, transistor 63 will be non-conductive and its impedance will be sufficiently high so that the voltage across resistor 58 is blanked out and no signal voltage will appear on the output lead 32.

If gate No. 1 is otherwise uncontrolled, wave form 60 will, therefore, appear on terminal 32. This signal pattern consists of a train of full sine waves separated from each other by the duration of the negative pulse from the flip-flop. As described above, when this signal is fed into a vibration or shock table 14, it is useful for various types of component testing. It is also apparent that by modifying the pulse repetition rate of the flip-flop 42, the interval between the pulses in wave form 60 can be varied.

To control gate No. 1, the base 61 of the transistor 63 is connected through a control switch 62 and a current limiting resistor 73 to the collector 75 of a transistor 77 in gate No. 2. The emitter 79 of transistor 77 is connected to ground through a current limiting resistor 81. With this arrangement, when transistor 77 is conductive, its impedance is so low that the base 61 of transistor 63 is effectively grounded. Consequently, transistor 63 cannot become conductive because the positive pulses from the flip-flop 42 cannot increase the potential on the base 61 of transistor 63. Similarly, when the transistor 77 becomes non-conductive, the base 61 of transistor 63 is ungrounded, so that transistor 63 becomes conductive when it receives a positive pulse from the flip-flop 42. It is evident, therefore, that by controlling transistor 77 the operation of gate No. 1 can be effectively controlled.

Since one of the objectives of this circuit is to isolate a single sine wave passing through gate No. 1, it is necessary to cause transistor 77 to become non-conductive for a proper interval of time and in proper synchronization with the sinusoidal output signal 13 from signal generator 12.

To time the operation of transistor 77, the output signal 43 from the flip-flop 42 is fed through lead 44 and branch 48 to a conventional inverter 50. The inverter output is a square wave signal 64, 180° opposite in phase to the signal 43 from the flip-flop 42. With this arrangement it is apparent that the signal 64 from the inverter 50 is positive when the signal 43 from the flip-flop 42 is negative, and, as explained above, this occurs during a blanked portion of the uncontrolled signal 60 from gate No. 1 (see time intervals $T_3$ to $T_5$, in FIGURE 3).

The inverter output signal 64 is transmitted through arm 66 of pulse switch 68 to the input lead 70 of a conventional monostable multivibrator 72. The multivibrator is designed such that, when it receives a positive pulse from the inverter, it produces a square wave pulse with a specified width regardless of the width of the input pulse. However, as explained above, this occurs only during a blanked portion of the signal from gate No. 1 or when the flip-flop is negative. This is important because it will permit the operation of the transistor 77 in gate No. 2 to be properly synchronized with the voltage signals in gate No. 1 for isolation of a single complete sinusoidal pulse from the voltage train. As seen, the width of the pulses from the multivibrator 72 can be controlled by means of a rotating switch 74 and associated capacitors 93 to provide a coarse pulse width adjustment. A fine pulse width adjustment is provided by means of a variable resistor 76.

When the multivibrator 72 delivers a positive pulse to output lead 78, the rise in potential appears on the base 83 of a transistor 85 in gate No. 2. This rise in potential causes the transistor 85 to become conductive, whereupon its internal impedance drops sharply. Since the transistor 85 and the resistor 80 are in series between a 9-volt power supply and ground, the decrease in internal impedance of transistor 77, when it becomes conductive, means that the primary voltage drop between the 9-volt supply and ground will be across resistor 80. Consequently, the potential on the collector 87 of transistor 85 will drop. Since the collector 87 of transistor 85 is connected to the base 95 of transistor 77 in gate No. 2, a drop in potential on the collector 87 will cause transistor 77 to become non-conductive. As explained above, this effectively disconnects the base 61 of the transistor 65 in gate No. 1 from ground so that the transistor 65 can respond to positive pulses from the flip-flop 42 and thereby "open" the gate.

In summary to this point, each time the multivibrator 72 emits a positive pulse, transistor 77 becomes non-conductive, effectively disconnecting the base 61 of transistor 65 from ground. Consequently, the transistor 65 can become conductive only when transistor 85 receives a positive pulse from the multivibrator 72. Additionally, the multivibrator can fire only when it receives a positive pulse from the inverter 52. As explained above, this occurs during a blanked portion of the uncontrolled signal 60 from gate No. 1, such as during times $T_3$ to $T_5$ or $T_7$ to $T_9$ (see FIGURE 3.) Hence, gate No. 2 opens gate No. 1 subject to the action of flip-flop 42 only during a blanked portion of the gate No. 1 signal.

When the positive pulse from the multivibrator 72 is completed, the transistor 85 becomes non-conductive so that the potential at the collector 87 of transistor 85 rises, causing the transistor 77 to become conductive. This effectively grounds the base 61 of transistor 65 and, in effect, shuts the gate to further signals.

It is apparent that in order to extract a full sinusoidal pulse from the signal generator 12, the pulse width 82 (FIGURE 3) from the multivibrator must be generally equal to twice the period of the full sine wave from signal generator 12. As explained above, the multivibrator starts sometime during a blanked portion of the signal from gate No. 1 Hence, resultant from having the pulse width of the multivibrator adjusted as described above (i.e., with the positive pulse width twice the period of the signal from signal generator 12), transistor 77 is non-conductive throughout the duration of the pulse 82 and gate No. 1 therefore opens long enough to permit a single full wave sinusoidal signal to pass through to output lead 32.

Were the circuit 26 complete as heretofore described, the multivibrator 72 would continue to operate, passing a full sine wave through gate No. 1 each time the multivibrator delivered a positive pulse. However, since one purpose of circuit 26 is to pass only a single pulse, it is necessary to limit the multivibrator to the delivery of a single positive pulse.

This is accomplished by connecting a delay circuit 84 to the multivibrator 72 through the input lead 70 and then effectively grounding the input lead 70 after a predetermined period of time to prevent the multivibrator from delivering more than a single positive pulse. The multivibrator input lead 70 is connected with resistor 97 and collector 99 of transistor 101 in the delay circuit, and the emitter 103 of transistor 101 is grounded through a current limiting resistor 105. A power supply 86 (preferably 12-volt) is connected to the base 107 of transistor 101 through delay switch 90, arm 67 of pulse switch 68, and a timing circuit 91.

The timing circuit comprises a capacitor 92 and a resistor 94 connected in parallel. With the delay switch 90 in the "on" position, the power supply 86 cannot initially cause transistor 101 to become conductive, because the timing circuit 91 temporarily prevents the potential on the base 107 of the transistor 101 from rising enough to make the transistor conductive.

Due to the high internal impedance in the transistor 101, the lead 70 is not grounded while the transistor 101 is non-conductive. Hence, the multivibrator 72 can function. However, after a period of time, the capacitor 92 charges, causing the potential on the base 107 of the transistor 101 to increase and the transistor 101 to become conductive. When transistor 101 is conductive, its internal impedance drops so that the input lead 70 of multivibrator 72 is effectively grounded, as indicated by signal 71 in FIGURE 3. This prevents the multivibrator from "seeing" another positive pulse from the inverter 50. Since it is necessary for the multivibrator to fire only one positive pulse, the capacitor 92 and resistor 94 of the delay circuit 90 are selected such that the transistor 101 becomes conductive after the multivibrator 72 has started its first positive pulse. Such selections are made in a manner well known in the art.

In summary, the sinusoidal signal from the signal generator 12 is fed into gate No. 1 through leads x—x. The effect of the flip-flop circuit 42, as related to gate No. 1, is to blank out alternate sinusoidal signals. The inverter 50 actuates the multivibrator 72 during blanked periods of gate No. 1. The multivibrator, because of the timing circuit 91, delivers only one pulse 82, but the width of the pulse is sufficient to cause gate No. 1 to remain open long enough for a single full sinusoidal wave to pass through gate No. 1 to lead 32, as shown by the signal 96 in FIGURE 3. In addition, the width and intensity of this single pulse are controlled by adjustments in the signal generator 12.

If environmental testing procedures require half of a sinusoidal pulse, switch 98 at the output of the flip-flop 42 is moved from the full wave position to the half wave position. This by-passes the flip-flop 42 so that the square wave output 41 of the Schmitt Trigger 40 is fed through lead 109 to lead 44. This delivers square wave pulses to gate No. 1 which are half the width of the output of the flip-flop so that the uncontrolled pulse train output of gate No. 1 is as indicated by wave form 100 in FIGURE 3. Similarly, the inverter 50 fed by the Schmitt Trigger 40 has an output indicated by wave form 102 in FIGURE 3.

In order to isolate a single half wave pulse, the multivibrator 72 must be adjusted so its pulse width signal 104 is cut in half. With this arrangement, gate No. 1 emits only a single half wave sinusoidal signal pulse 105.

The output signal may be inverted independently of the input signal. To invert the signal passing through gate No. 1, reversing switch 36 is actuated. A phase shifting network comprising a variable resistor 108 and a capacitor 110 may be provided at the input of gate No. 1 to make any phase adjustments which circuit conditions require. It is also apparent that by moving the delay switch 90 to the "off" position, the delay circuit 84 is isolated and the multivibrator output is a continuous square wave signal. Consequently, the output of gate No. 1 is capable of being further modified to vary the spacing between the pulses passing therethrough.

Although a specific embodiment of the invention has been shown and described, it is to be understood that certain alterations, modifications and substitutions may be made to the instant disclosure without departing from the spirit and scope of the invention as defined by the appended claims.

I claim:

1. A controllable pulse generator comprising:
   (a) signal generator means for continuously generating an alternating signal having a predetermined amplitude and period;
   (b) square wave generator means responsive to said alternating signal for generating a train of square waves each having a duration equal to a predetermined portion of said alternating signal period;
   (c) gate signal generator means receiving said train of square waves for generating a single pulse signal in response to the first only of said square waves, said single pulse signal having a duration equal to a selectively predetermined integral multiple of said square wave duration; and
   (d) gate means coupled in output relationship to all of said generator means for permitting output passage of said alternating signal during only coincident occurrence of said single pulse signal and one of said square waves.

2. A controllable pulse generator comprising:
   (a) signal generator means for continuously generating an alternating signal having a predetermined amplitude and period;
   (b) square wave generator means responsive to said alternating signal for generating a train of square waves having a period twice that of said alternating signal period;
   (c) gate signal generator means receiving said train of square waves for generating a single pulse signal in response to the first only of said square waves, said single pulse signal having a duration equal to only one period of said square waves; and
   (d) gate means coupled in output relationship to all of said generator means for permitting output passage of one full period of said alternating signal during only coincident occurrence of said single pulse signal and the corresponding polarity portion of one of said square waves.

3. A controllable pulse generator comprising:
   (a) signal generator means for continuously generating an alternating signal having a predetermined amplitude and period;
   (b) square wave generator means responsive to said alternating signal for generating a train of square waves having a period equal to that of said alternating signal period;
   (c) gate signal generator means receiving said train of square waves for generating a single pulse signal in response to the first only of said square waves, said single pulse signal having a duration equal to only one period of said square waves; and (d) gate means coupled in output relationship to all of said generator means for permitting output passage of one half of a period of said alternating signal during only coincident occurrence of said single pulse signal and the corresponding polarity portion of one of said square waves.

4. A controllable pulse generator comprising:
(c) signal generator means for continuously generating an alternating signal having a predetermined amplitude and period,
(b) first pulse generator means responsive to said alternating signal for generating a first train of pulses each having a duration equal to a predetermined portion of said alternating signal period,
(c) second pulse generator means responsive to said first pulse generator means for generating a second train of pulses each having a duration equal to twice the period of each pulse of said first train of pulses,
(d) gate generator means responsive to a selected pulse from one of said pulse generators for generating a single gating pulse having a duration equal to a multiple of said selected pulse, and
(e) gate means responsive to the simultaneous application of said alternating signal, said selected pulse and said gating pulse for providing output passage of said alternating signal during the coincidence of said selected pulse and said gating pulse.

References Cited by the Examiner
UNITED STATES PATENTS

| | | | |
|---|---|---|---|
| 2,831,971 | 4/1958 | Wischmeyer | 328—99 |
| 3,069,569 | 12/1962 | Singer et al. | 307—88.5 |
| 3,124,705 | 3/1964 | Gray | 307—88.5 |

DAVID J. GALVIN, *Primary Examiner.*

ARTHUR GAUSS, *Examiner.*